United States Patent
Mihara

(10) Patent No.: US 11,083,349 B2
(45) Date of Patent: Aug. 10, 2021

(54) FLUID DAMPER DEVICE AND APPARATUS WITH DAMPER

(71) Applicant: NIDEC SANKYO CORPORATION, Nagano (JP)

(72) Inventor: Naoya Mihara, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 422 days.

(21) Appl. No.: 16/316,044

(22) PCT Filed: May 12, 2017

(86) PCT No.: PCT/JP2017/018018
§ 371 (c)(1),
(2) Date: Jan. 8, 2019

(87) PCT Pub. No.: WO2018/207342
PCT Pub. Date: Nov. 15, 2018

(65) Prior Publication Data
US 2021/0196087 A1 Jul. 1, 2021

(51) Int. Cl.
*F16F 9/12* (2006.01)
*A47K 13/12* (2006.01)
*F16F 9/14* (2006.01)

(52) U.S. Cl.
CPC .............. *A47K 13/12* (2013.01); *F16F 9/12* (2013.01); *F16F 9/14* (2013.01)

(58) Field of Classification Search
CPC .... A47K 13/12; F16F 9/12; F16F 9/14; F16F 9/145; F16F 9/369; F16F 2232/02
See application file for complete search history.

(56) References Cited

FOREIGN PATENT DOCUMENTS

| | | |
|---|---|---|
| CN | 106175559 | 12/2016 |
| JP | H05240284 | 9/1993 |
| JP | H06112538 | 4/1994 |
| JP | 2002021903 | 1/2002 |
| JP | 2005140248 | 6/2005 |
| JP | 2005140287 | 6/2005 |
| JP | 2006112538 | 4/2006 |
| JP | 2016223538 | 12/2016 |

OTHER PUBLICATIONS

"Office Action of China Counterpart Application," dated Feb. 21, 2020, with English translation thereof, p. 1-p. 12.
"International Search Report (Form PCT/ISA/210)" of PCT/JP2017/018018, dated Aug. 15, 2017, with English translation thereof, pp. 1-4.

*Primary Examiner* — Thomas W Irvin
(74) *Attorney, Agent, or Firm* — JCIPRNET

(57) ABSTRACT

The fluid damper device (10) includes a rotor (30) inserted into a case (20) in a bottomed tube shape and a cover (60) fixed to an opening part (29) of the case (20). The inner peripheral face of the case (20) is formed with the welding protruded part (80) welded to the cover (60) in a part in a circumferential direction. As the flow-out prevention part (90), a second flow-out prevention part (92) is formed on the inner peripheral side of the welding protruded part (80) on the other side (L2) in the axial line (L) direction with respect to the welding range (X). A circular arc-shaped step face (76) functioning as a flow-out restriction part (95) is provided on the other side (L2) in the axial line (L) direction of the second flow-out prevention part (92) and the projected resin is restricted from reaching to the O-ring (49).

24 Claims, 9 Drawing Sheets

FLUID DAMPER DEVICE AND APPARATUS WITH DAMPER

CROSS-REFERENCE TO RELATED APPLICATION

This application is a 371 application of the International PCT application serial no. PCT/JP2017/018018, filed on May 12, 2017. The entirety of each of the above-mentioned patent applications is hereby incorporated by reference herein and made a part of this specification.

TECHNICAL FIELD

The present invention relates to a fluid damper device in which a fluid is filled between a case and a rotor, and an apparatus with a damper.

BACKGROUND ART

A fluid damper device in which a fluid such as oil is filled between a case in a bottomed tube shape and a rotor is disclosed in Patent Literature 1. In the fluid damper device disclosed in Patent Literature 1, one end in an axial direction of the rotor (turning shaft) is disposed inside the case, a damper chamber is formed between the turning shaft and an inner peripheral face of the case, and a valve body provided on a side face of the turning shaft is disposed in the damper chamber. When the rotor is turned in a first direction, a tip end in a radial direction of the valve body is contacted with the inner peripheral face of the case. Therefore, a turning load of the rotor is large. On the other hand, when the rotor is turned in an opposite direction to the first direction, a gap is formed between the valve body and the inner peripheral face of the case due to resistance of the fluid and thus the fluid passes through the gap and the turning load of the rotor is small.

CITATION LIST

Patent Literature

[PTL 1] Japanese Patent Laid-Open No. 2016-223538

SUMMARY OF THE INVENTION

Technical Problem

In the fluid damper device disclosed in Patent Literature 1, the rotor is prevented from coming off from the case by a cover fixed to an opening part of the case. As a fixing method of the cover, a screw type fixing method is used in which a female screw formed on an inner peripheral face of the case and a male screw formed on an outer peripheral face of the cover are threadedly engaged with each other. However, the screw type requires a large dimension in an axial direction and a die cost for molding a screw part is high. Therefore, fixing by welding is performed in order to make thin in an axial direction and reduce cost. In a case that a cover is to be fixed to a case by welding, an inner peripheral face of the case and an end part of the cover inserted into an inner side of the case are melted and the cover is pushed into the case.

In a case that a cover is to be fixed to a case by welding, welding material such as resin may be projected from a welded portion. For example, when the welding material is projected to the damper chamber side, sealability of the damper chamber may be deteriorated to reduce damper performance.

In view of the problem described above, an objective of the present invention is to appropriately handle welding material when a cover is welded and fixed to a case of a fluid damper device.

Means to Solve the Problems

To solve the above-mentioned problem, the present invention provides a fluid damper device including a case in a bottomed tube shape which is opened to one side in an axial direction, a rotor having a turning shaft and a valve body which are inserted into a damper chamber formed in the case, a fluid which is filled in the damper chamber, a cover which is provided with a through hole through which the rotor is penetrated and is fixed to an opening part of the case, and a sealing member which seals a gap space between an outer peripheral face of the rotor and an inner peripheral face of the case. The inner peripheral face of the case is formed with a welding protruded part welded to the cover in a part in a circumferential direction, the welding protruded part and the cover are welded to each other in a predetermined range in the axial direction, and a flow-out prevention part is provided on an inner side in a radial direction of the welding protruded part on the other side in the axial direction with respect to the predetermined range.

In the present invention, the inner peripheral face of the case of the fluid damper device is formed with the welding protruded part which is welded to the cover in a part in a circumferential direction. Further, the flow-out prevention part is provided on the other side in the axial direction with respect to the range in the axial direction where the case and the cover are welded to each other (in other words, on the damper chamber side), and on the inner side in the radial direction with respect to the inner peripheral face of the welding protruded part. For example, as the flow-out prevention part, a gap space (in other words, welding burr reservoir) may be provided which is capable of holding welding material such as resin projected from the welding part. According to this structure, welding material projected from the welding portion to the other side in the axial direction can be held by the flow-out prevention part. Therefore, the welding material projected from the welding portion can be appropriately handled.

In the present invention, it is desirable that a flow-out restriction part is provided on the other side in the axial direction of the flow-out prevention part. For example, it is desirable that the flow-out restriction part is provided with a flat face intersecting the axial direction. Further, in this case, it is desirable that a range in the radial direction where the flat face is provided is within a range from an inner peripheral face of the welding protruded part to a sealing position where the sealing member is abutted with an inner peripheral face of the case. According to this structure, welding material can be restricted from projecting from the flow-out prevention part to the other side in the axial direction (damper chamber side).

In the present invention, it is desirable that the flow-out restriction part is provided in an angular range corresponding to the welding protruded part. For example, it is desirable that the flow-out restriction part is provided over the entire range where the welding protruded part is provided. According to this structure, there is less possibility that the welding material is projected from a gap space in a circumferential direction to the other side in the axial direction (damper chamber side).

In this case, it is desirable that the flow-out restriction part is provided on the one side in the axial direction with respect to the sealing member. According to this structure, deformation of the sealing member due to the welding material can be prevented. Therefore, there is less possibility that sealability of the damper chamber is deteriorated.

Further, it is desirable that an inner peripheral edge of the flow-out restriction part is formed in a circular arc shape having the same diameter as a diameter of an inner peripheral face of the damper chamber. According to this structure, there is less possibility that the welding material is projected from a gap space in a radial direction to the other side in the axial direction (damper chamber side).

In the present invention, it is desirable that an inner peripheral face of the welding protruded part is formed in a circular arc shape with a turning center of the rotor as a center. According to this structure, the welding protruded part and the cover can be uniformly welded in a circumferential direction.

In the present invention, it is desirable that the welding protruded part is provided with a tapered face inclined in a direction enlarging to an outer side in the radial direction as going to the one side in the axial direction. When the tapered face is provided, the case and the cover can be easily positioned coaxially. Further, an outer circumferential edge of the tip end face of the cover can be contacted with the tapered face of the welding protruded part not by a face but by a line and thus, when ultrasonic welding is to be performed, a satisfactory contact state can be attained.

In the present invention, it is desirable that the flow-out prevention part is provided at a position adjacent to the welding protruded part in a circumferential direction on the other side in the axial direction with respect to the predetermined range. According to this structure, welding material projected from the welding portion to both sides in the circumferential direction can be held by the flow-out prevention part. Therefore, the welding material projected from the welding portion can be handled appropriately.

In the present invention, it is desirable that the flow-out prevention part is provided on the one side in the axial direction of the predetermined range. According to this structure, welding material projected to the one side in the axial direction (opening part side of the case) with respect to the welding range can be held in the flow-out prevention part. Therefore, there is less possibility that the welding material is projected to the outside of the case and the cover to form a welding burr. Accordingly, there is less possibility that process for removing a welding burr is required.

In the present invention, it is desirable that the cover is provided with a small diameter part which is inserted into the case and is welded to the welding protruded part and a large diameter part having a larger diameter than a diameter of the small diameter part, and the flow-out prevention part provided on the one side in the axial direction of the predetermined range is covered by the large diameter part from the one side in the axial direction. According to this structure, the flow-out prevention part is unable to be observed from the outside by the large diameter part and thus the welding material held by the flow-out prevention part is unable to be observed from the outside and its appearance is satisfactory. Further, even if a very small amount of welding material is projected from the flow-out prevention part and a welding burr is formed, the welding burr is covered by the large diameter part and is not directly observed and thus there is less possibility that process for removing the welding burr is required.

In the present invention, it is desirable that the case is provided with a circular arc-shaped inner peripheral face with a turning center of the rotor as a center at a position different from the welding protruded part in the circumferential direction, and the small diameter part is positioned in a direction perpendicular to the axial direction by the circular arc-shaped inner peripheral face. According to this structure, the cover and the case can be coaxially positioned at a position different from the welding portion in the circumferential direction.

In the present invention, it is desirable that an inner peripheral face of the case is formed with an abutting part which is abutted in the axial direction with the cover at a position different from the welding protruded part in the circumferential direction, and one end in the axial direction of the welding protruded part, the abutting part, and the other end in the axial direction of the welding protruded part are arranged in this order in the axial direction. According to this structure, a tip end face of the cover is abutted with the welding protruded part and melted and, the cover is pushed to a position where the tip end face of the cover is abutted with the abutting part, thus the cover can be positioned in the axial direction. As a result, a lower end (the other side end part in the axial direction) of the welding range and the abutting part become the same positions as each other in the axial direction and thus, the flow-out prevention part can be formed on the other side in the axial direction with respect to the abutting part. Further, the welding protruded part and the abutting part are formed at positions different from each other in the circumferential direction and thus there is less possibility that the abutting part is deformed. Therefore, positioning in the axial direction of the cover can be performed with a high degree of accuracy and thus the cover can be fixed appropriately. As a result, accuracy of dimension in the axial direction of the damper chamber can be enhanced and dispersion of the damper performance can be restrained.

In the present invention, an inner peripheral face of the case is formed with a partitioning protruded part which partitions the damper chamber in the circumferential direction, and the abutting part is formed at a position corresponding to the partitioning protruded part in the circumferential direction. According to this structure, positioning in the axial direction of the cover can be performed with a high degree of accuracy at a position of the partitioning protruded part. Therefore, accuracy of dimension in the axial direction of the damper chamber can be enhanced and dispersion of the damper performance can be restrained.

In the present invention, an end face on the one side in the axial direction of the partitioning protruded part is formed with a rib extended in a radial direction, and the abutting part is formed in a range including an angular position of the rib. According to this structure, positioning in the axial direction of the cover can be performed with a high degree of accuracy at a position of the rib for enhancing sealing accuracy of the damper chamber. Therefore, the sealing accuracy of the damper chamber can be enhanced.

In the present invention, the abutting part is formed at two positions oppositely with a center in the diameter direction of the case as a reference. For example, the abutting part is formed at two positions on a straight line extended in a diameter direction of the case and on opposite sides to each other with the center in the diameter direction of the case as the reference. As described above, when two abutting parts are formed oppositely with respect to the center in the diameter direction, positioning in the axial direction of the cover can be performed with a high degree of accuracy. Further, in a case that two abutting parts are formed on a straight line extended in the diameter direction, an inclination of the cover can be restrained.

In the present invention, the abutting part is formed at three positions separated from each other in the circumferential direction, and two of the three positions are arranged on an opposite side to remaining one position of the three positions with a center in a radial direction of the case as a reference. For example, the abutting part is formed at three positions at equal angular intervals with the center in the diameter direction of the case as the reference. As described above, when two of the three positions separated from each other in the circumferential direction are formed on an opposite side to remaining one position, positioning in the axial direction of the cover can be performed with a high degree of accuracy. Especially, when the abutting parts are equally formed in the circumferential direction, positioning in the axial direction of the cover can be performed with a high degree of accuracy and an inclination of the cover can be restrained.

In the present invention, the abutting part is formed at four positions separated from each other in the circumferential direction, two of the four positions are located at two positions on a first straight line extended in a diameter direction of the case and arranged oppositely with a center in the diameter direction of the case as a reference, the two positions being overlapped with the ribs in the axial direction, and remaining two positions of the four positions are located at two positions on a second straight line extended in a diameter direction of the case and intersecting the first straight line and arranged oppositely with the center in the diameter direction of the case as the reference. For example, the abutting part is formed at four positions at equal angular intervals with the center in the diameter direction of the case as the reference. According to this structure, positioning in the axial direction of the cover can be performed with a high degree of accuracy. Further, when positioning in the axial direction of the cover is performed at a position of the rib for enhancing sealing accuracy of the damper chamber, the sealing accuracy of the damper chamber can be enhanced. Further, when the abutting parts are equally formed in the circumferential direction, positioning in the axial direction of the cover can be performed with a high degree of accuracy and an inclination of the cover can be restrained.

Next, the present invention provides an apparatus with a damper including the fluid damper device described above and an opening and closing member which is turnable with respect to an apparatus main body is attached to the turning shaft. For example, the opening and closing member is a toilet seat of a Western-style toilet bowl. As described above, in a case that an opening and closing member such as a toilet seat is attached to the turning shaft of the fluid damper device, a turning load of the opening and closing member can be increased. Therefore, a rapid operation of the opening and closing member can be restrained.

Effects of the Invention

In the present invention, the inner peripheral face of the case of the fluid damper device is formed with the welding protruded part which is welded to the cover in a part in a circumferential direction. Further, the flow-out prevention part is provided on the other side in the axial direction with respect to the range in the axial direction where the case and the cover are welded to each other (in other words, on the damper chamber side), and on the inner side in the radial direction with respect to the inner peripheral face of the welding protruded part. Therefore, welding material projected from the welding portion to the other side in the axial direction can be held by the flow-out prevention part, and the welding material projected from the welding portion can be handled appropriately.

DESCRIPTION OF EMBODIMENTS

An embodiment to which the present invention is applied will be described below with reference to the accompanying drawings. In the following descriptions, a direction in which a turning shaft 40 of a rotor 30 is extended is referred to as an axial line "L" direction and, in the axial line "L" direction, a side where the turning shaft 40 is protruded from a case 20 is referred to as one side "L1", and an opposite side to the side where the turning shaft 40 is protruded from the case 20 is referred to as the other side "L2".

(Apparatus with Damper)

Figure 1:
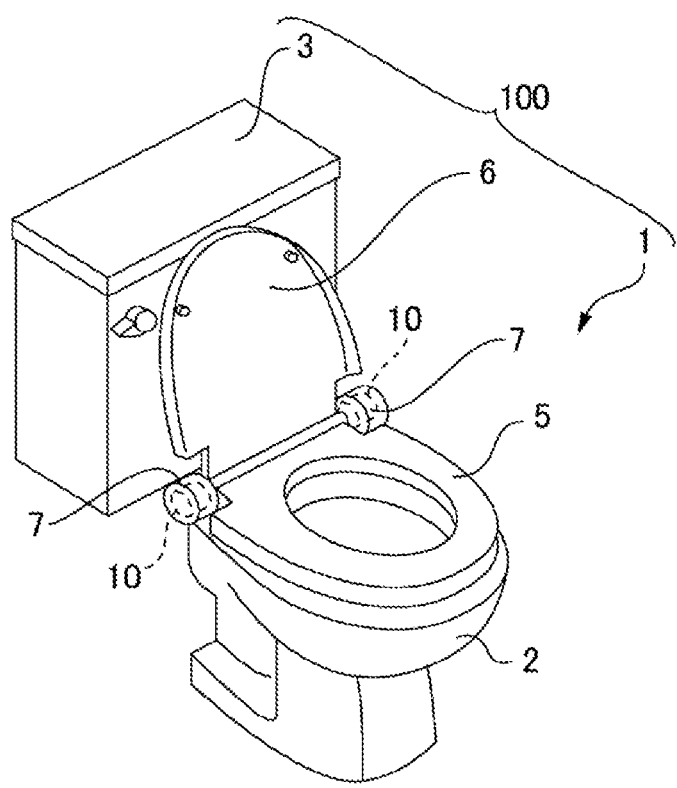
FIG. 1 is an explanatory view showing a Western-style toilet unit including a Western-style toilet bowl on which a fluid damper device to which the present invention is applied is mounted.

FIG. 1 is an explanatory view showing a Western-style toilet unit 100 including a Western-style toilet bowl 1 on which a fluid damper device 10 to which the present invention is applied is mounted. The Western-style toilet unit 100 shown in FIG. 1 includes a Western-style toilet bowl 1 (apparatus with a damper) and a water tank 3. The Western-style toilet bowl 1 includes a toilet bowl main body 2 (apparatus main body), a toilet seat 5 (opening and closing member) made of resin, a toilet cover 6 (opening and closing member) made of resin, unit covers 7 and the like. Fluid damper devices 10 for a toilet seat and a toilet cover are incorporated in the insides of the unit covers 7, and the toilet seat 5 and the toilet cover 6 are respectively connected with the toilet bowl main body 2 through the fluid damper device 10. In this embodiment, the structures of the fluid damper device 10 connected with the toilet seat 5 and the fluid damper device 10 connected with the toilet cover 6 may be the same as each other. In the following descriptions, the fluid damper device 10 connected with the toilet seat 5 will be described below.

Figure 2:
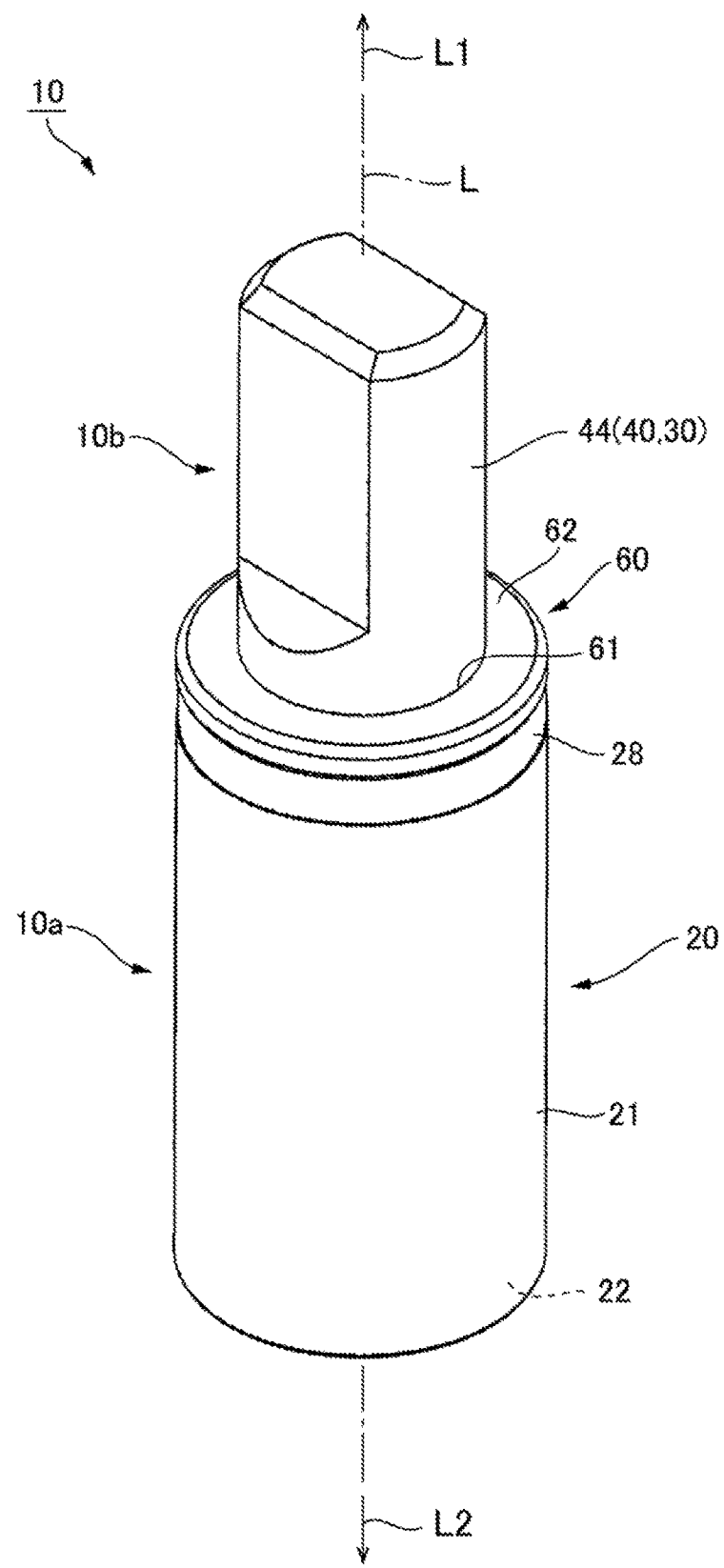
FIG. 2 is an outward perspective view showing a fluid damper device.

FIG. 2 is a perspective view showing the fluid damper device 10 which is viewed from one side "L1". The fluid damper device 10 includes a fluid damper device main body 10a in a cylindrical shape extended in the axial line "L" direction and a connecting shaft 10b which is protruded to one side "L1" from the fluid damper device main body 10a. The connecting shaft 10b is connected with a toilet seat 5. A tip end part of the connecting shaft 10b is formed with flat faces facing each other and thus idling of the toilet seat 5 to the connecting shaft 10b is prevented. When the toilet seat 5 in a standing-up state is to be fallen down so as to cover a toilet bowl main body 2, the fluid damper device 10 generates a force (turning load) resistant to it to reduce a falling speed of the toilet seat 5.

(Fluid Damper Device)

Figure 3:
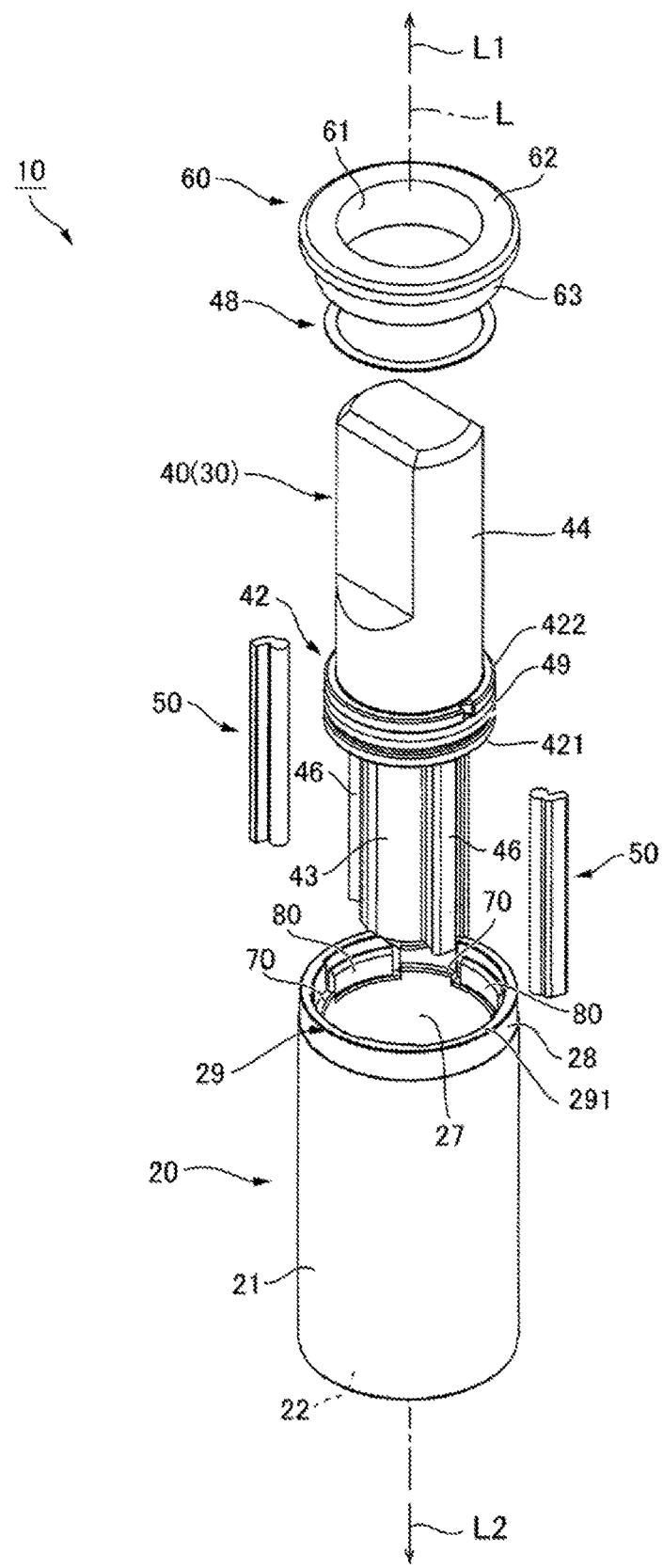
FIG. 3 is an exploded perspective view showing a fluid damper device.
Figure 4:
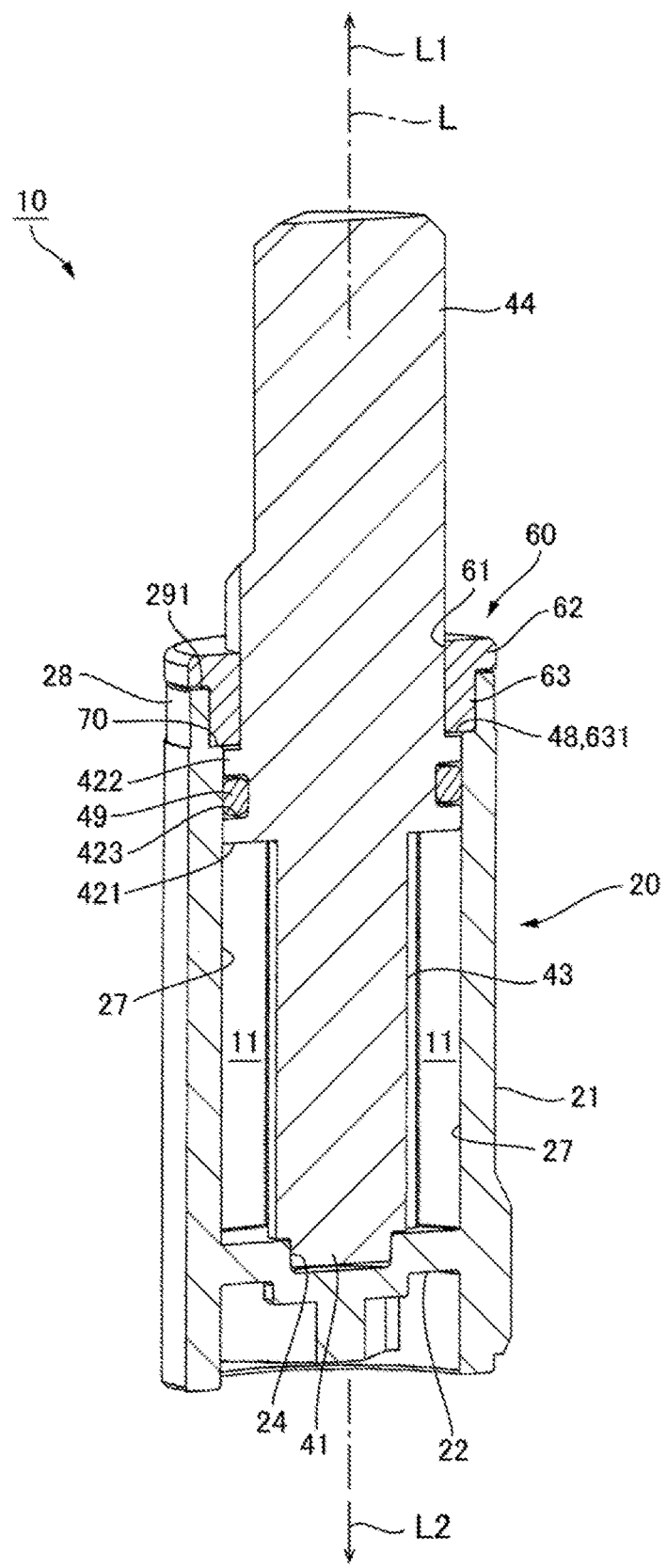
FIG. 4 is a cross-sectional perspective view showing a fluid damper device which is cut by a plane along an axial line.
Figure 5:
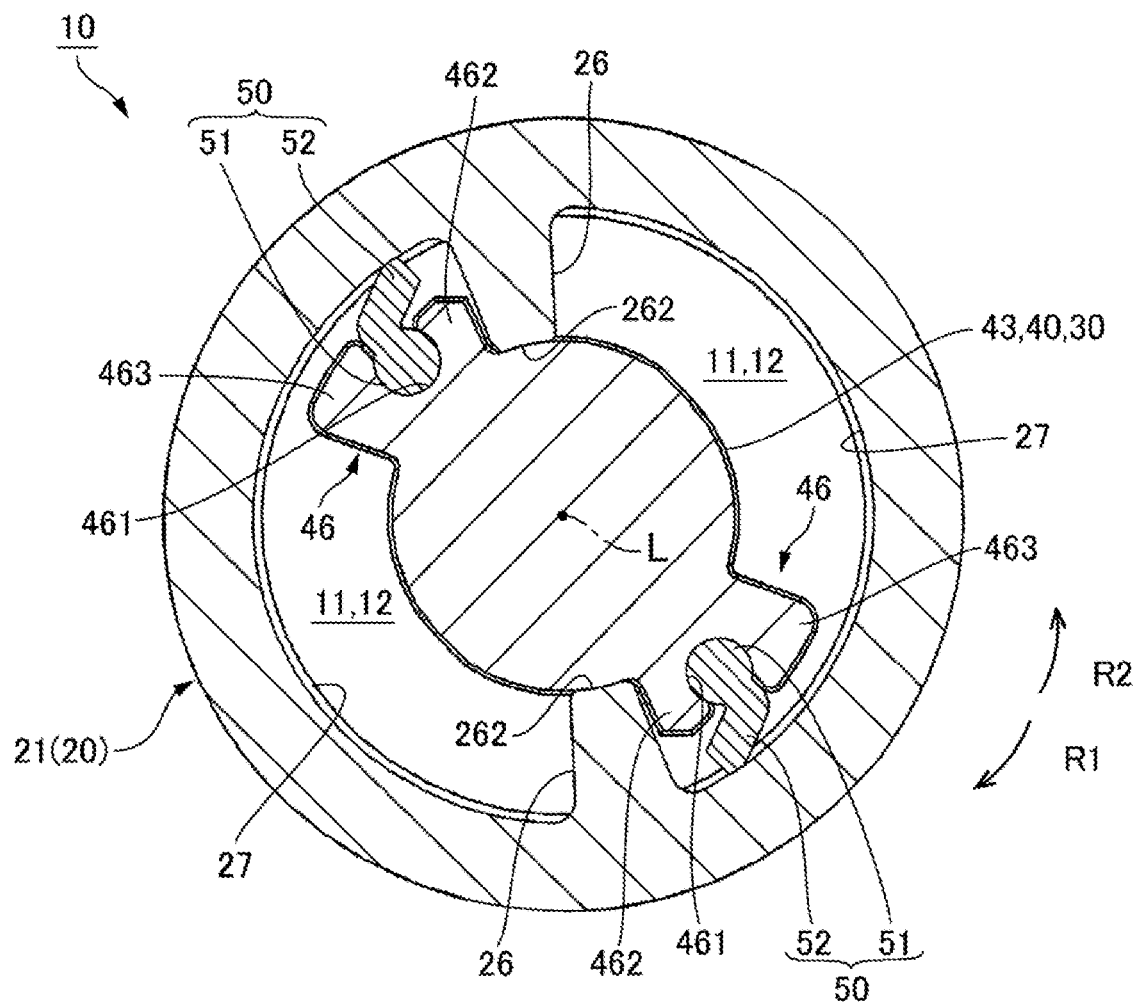
FIG. 5 is a cross-sectional view showing a fluid damper device which is cut by a plane perpendicular to an axial line.

FIG. 3 is an exploded perspective view showing the fluid damper device. Further, FIG. 4 is a cross-sectional perspective view showing the fluid damper device 10 which is cut by a plane along the axial line "L". FIG. 5 is a cross-sectional view showing the fluid damper device which is cut by a plane perpendicular to the axial line "L". The fluid damper device 10 includes a case 20 in a bottomed tube shape, a rotor 30 which is turnably held by the case 20, and a cover 60 in a circular ring shape which closes an opening part 29 of the case 20. In this embodiment, the case 20 and the cover 60 are resin molded articles.

The case 20 is provided with a body part 21 in a cylindrical tube shape extended in the axial line "L" direction and a bottom part 22 which closes an end part on the other side "L2" of the body part 21. The opening part 29 is formed at an end part on one side "L1" of the body part 21. As shown in FIG. 4, a center of the bottom part 22 is formed with a circular recessed part 24 which is recessed to the other side "L2". A shaft part 41 provided at a tip end on the other side "L2" of the turning shaft 40 of the rotor 30 is inserted into the recessed part 24. The shaft part 41 is turnably held by the recessed part 24.

As shown in FIG. 5, an inner peripheral face of the body part 21 is formed with partitioning protruded parts 26 which are protruded to an inner side in the radial direction at two positions shifted by 180° to each other in the circumferential direction. The partitioning protruded part 26 is extended in the axial line "L" direction and an end part on the other side "L2" of the partitioning protruded part 26 is connected with the bottom part 22. A dimension in the circumferential direction (thickness) of the partitioning protruded part 26 becomes thinner to an inner side from an outer side in the radial direction. The partitioning protruded part 26 sections a damper chamber 11 formed on an inner side of the body part 21 in the circumferential direction.

The rotor 30 includes a turning shaft 40 whose end part on the other side "L2" is disposed inside the case 20 and valve bodies 50 held by the turning shaft 40. The turning shaft 40 is formed in a straight line shape as a whole and a ring-shaped flange part 42 is formed at a position on the other side "L2" with respect to a center in the axial line "L" direction. The flange part 42 is formed on the entire periphery of the turning shaft 40. A first shaft part 43 whose diameter is smaller than the flange part 42 is provided on the other side "L2" with respect to the flange part 42, and a second shaft part 44 whose diameter is smaller than the flange part 42 and larger than the first shaft part 43 is provided on one side "L1" with respect to the flange part 42. The shaft part 41 inserted into the recessed part 24 of the case 20 is protruded from a center of a tip end face of the first shaft part 43. A tip end of the second shaft part 44 is formed with flat faces facing each other.

The flange part 42 is provided with a first flange part 421 and a second flange part 422 which are disposed with a predetermined space therebetween in the axial line "L" direction, and a ring-shaped circumferential groove 423 (see FIG. 4) is formed between the first flange part 421 and the second flange part 422. An O-ring 49 is fitted to the circumferential groove 423. When the rotor 30 is attached to the case 20, the O-ring 49 is abutted with and crushed by a cylindrical-shaped inner peripheral face 27 of the case 20. Therefore, a gap between the case 20 and the flange part 42 is sealed and the damper chamber 11 sealed from the outside is formed between the bottom part 22 of the case 20 and the flange part 42. A fluid 12 (viscous fluid) such as oil is filled in the damper chamber 11.

After that, the cover 60 is inserted between the second shaft part 44 of the turning shaft 40 and the body part 21 of the case 20 and, when the cover 60 is fixed to the opening part 29 of the case 20, the fluid damper device 10 is structured. In this case, a washer 48 in a circular ring shape is disposed between the cover 60 and the second flange part 422 of the turning shaft 40. In this state, the shaft part 41 provided at an end part on the other side "L2" of the turning shaft 40 is turnably supported by the recessed part 24 formed in the bottom part 22 of the case 20, and the second shaft part 44 is turnably supported on an inner side of a through hole 61 formed in the cover 60. Further, a part of the second shaft part 44 is penetrated through the through hole 61 of the cover 60 and is protruded to one side "L1" and thereby a connecting shaft 10b is structured.

Abutting faces where the washer 48 and the second flange part 422 are abutted with each other are sliding faces which are slid when the rotor 30 is turned. In other words, in the rotor 30, a face on one side "L1" of the second flange part 422 is a sliding face which slides on the washer 48. When the washer 48 is made of metal, wear of the sliding face can be restrained. In this embodiment, it is preferable to apply a lubricant such as grease to the sliding face.

(Damper Chamber)

As shown in FIG. 5, a ring-shaped damper chamber 11 is provided between the body part 21 and the first shaft part 43. An inner peripheral side end face 262 of the partitioning protruded part 26 which is protruded to an inner side from an inner peripheral face of the body part 21 is abutted with an outer peripheral face of the first shaft part 43. Therefore, the damper chamber 11 is sectioned into two chambers having the same shape by the partitioning protruded parts 26 provided at two positions. On the outer peripheral face of the first shaft part 43, a valve body holding part 46 is formed at two positions separated from each other by 180° in the circumferential direction. The two valve body holding parts 46 are formed in the same shape as each other and are protruded to an outer side in the radial direction from the outer peripheral face of the first shaft part 43. Further, the valve body holding part 46 is extended to an end part on the other side "L2" of the first shaft part 43, and an end part on one side "L1" is connected with the first flange part 421.

Each of the two valve body holding parts 46 holds the valve body 50. The valve body holding part 46 is structured so that a width in the circumferential direction on an inner side in the radial direction is smaller than that on an outer side in the radial direction. An end part on the outer side in the radial direction of the valve body holding part 46 is formed with a valve body holding groove 461 which is recessed to the inner side in the radial direction. The valve body holding groove 461 is formed between a first protruded part 462 located on one side in the circumferential direction and a second protruded part 463 located on the other side in the circumferential direction, and the valve body holding groove 461 is extended in a straight line shape in the axial line "L" direction. The valve body holding groove 461 is formed in a circular arc shape so that its inner peripheral face is curved over an angular range exceeding about 180°.

The valve body 50 is provided with a base part 51 held by the valve body holding groove 461 and a tip end part 52 protruded from the base part 51 to an outer side in the radial direction. The tip end part 52 of the valve body 50 is protruded in a direction inclined with respect to the radial direction and is contacted with the cylindrical-shaped inner peripheral face 27. In this embodiment, a protruding dimension of the first protruded part 462 to the outer side in the radial direction is smaller than that of the second protruded part 463, and the tip end part 52 of the valve body 50 is inclined to a side covering an outer peripheral side of the first protruded part 462.

In the fluid damper device 10, when the toilet seat 5 shown in FIG. 1 is performed with a closing operation in which the toilet seat 5 is turned from a standing posture to a flat posture, the rotor 30 (turning shaft 40) is turned in a first direction "R1" (see FIG. 5) around the axial line "L". The first direction "R1" is a direction in which the rotor 30 is turned to a side where the tip end part 52 is located with respect to the base part 51 of the valve body 50. In this case, the tip end part 52 of the valve body 50 is pressed on the cylindrical-shaped inner peripheral face 27 by pressure of the fluid 12. Therefore, the fluid 12 is unable to pass through between the valve body 50 and the cylindrical-shaped inner peripheral face 27 and thus a turning load is applied to the rotor 30 (turning shaft 40). However, also in this case, a slight gap space is existed between the bottom part 22 of the case 20 and the valve body 50 and thus movement of the fluid is slightly permitted. Therefore, although a turning load is applied to the rotor 30, turning in the first direction "R1" is permitted at a low speed.

Further, when the toilet seat 5 shown in FIG. 1 is performed with an opening operation in which the toilet seat 5 is turned from a flat posture to a standing posture, the rotor 30 (turning shaft 40) is turned in a second direction "R2" (see FIG. 5) around the axial line "L". The second direction "R2" is a reverse direction to the first direction "R1". In this case, the tip end part 52 of the valve body 50 is separated from the cylindrical-shaped inner peripheral face 27 by pressure of the fluid 12 and thus the fluid 12 is capable of passing between the valve body 50 and the cylindrical-shaped inner peripheral face 27. Therefore, the turning load of the rotor 30 is small.

(Sealing Structure in Axial Line "L" Direction of Damper Chamber)

An end part on one side "L1" of the valve body 50 is contacted with the first flange part 421. Therefore, a gap space is hardly existed between the valve body 50 and the first flange part 421. Accordingly, the fluid 12 does not pass between the valve body 50 and the first flange part 421. On the other hand, an end part on the other side "L2" of the valve body 50 is located slightly on one side "L1" with respect to the end face on the other side "L2" of the valve body holding part 46. Therefore, on the other side "L2" with respect to the valve body 50, a slight gap space is existed between the end part on the other side "L2" of the valve body 50 and the bottom part 22 of the case 20. Therefore, the fluid 12 is capable of slightly passing through the gap space.

In the turning shaft 40, an end face on the other side "L2" of the first shaft part 43 and an end face on the other side "L2" of the valve body holding part 46 structure a continuous surface. In this embodiment, a gap space may be existed between the end faces on the other side "L2" of the first shaft part 43 and the valve body holding part 46 and the bottom part 22 of the case 20. However, the end faces on the other side "L2" of the first shaft part 43 and the valve body holding part 46 are formed with ribs (not shown) extended in the radial direction. The ribs are crushed to a state corresponding to the gap space between the end faces on the other side "L2" of the first shaft part 43 and the valve body holding part 46 and the bottom part 22 of the case 20 when the fluid damper device 10 is structured. Therefore, it is structured that the fluid 12 does not pass through between the end faces on the other side "L2" of the first shaft part 43 and the valve body holding part 46 and the bottom part 22 of the case 20.

Figure 6:
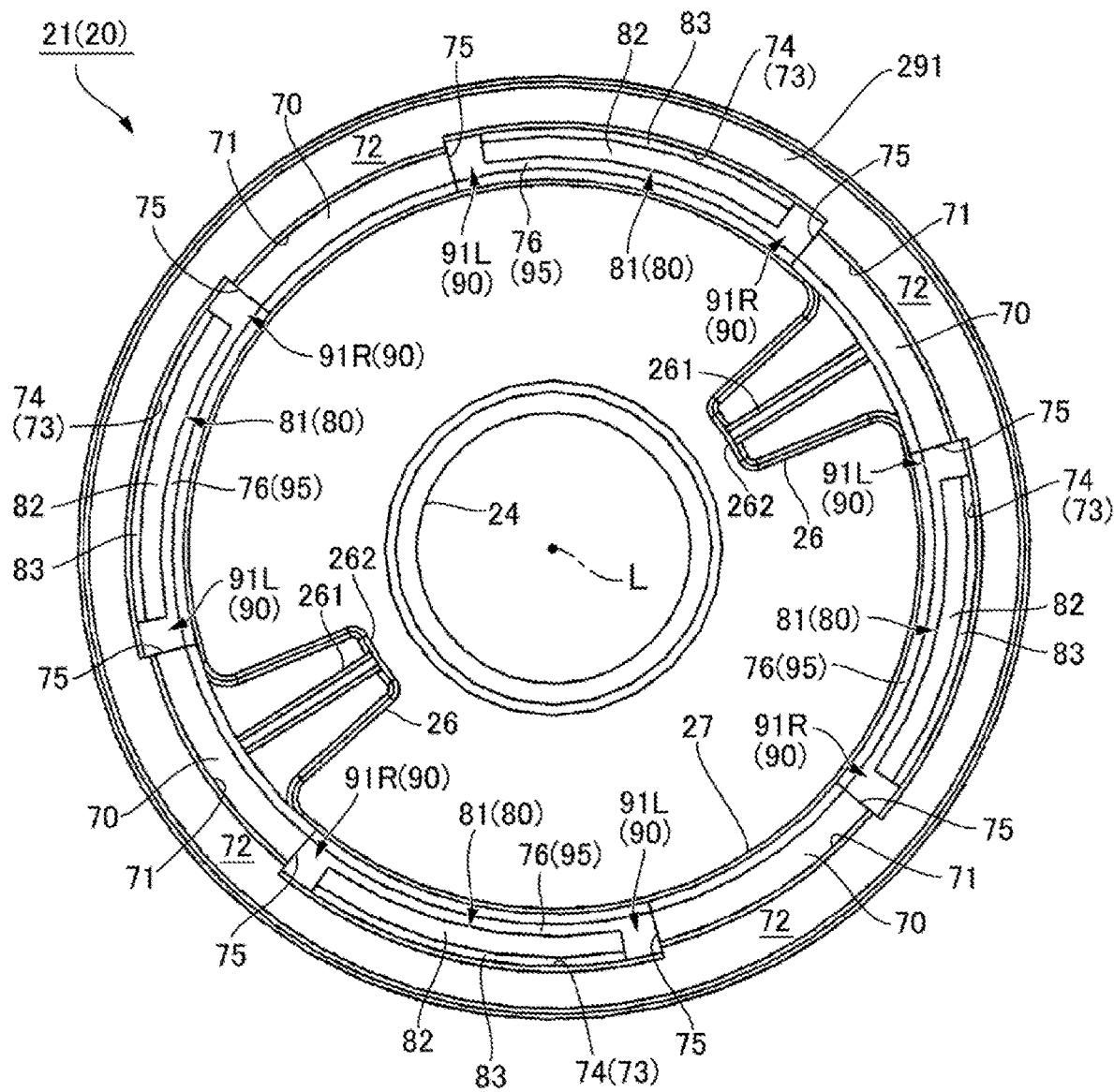
FIG. 6 is a front view showing an opening part of a case which is viewed from one side in an axial direction.
Figure 7:
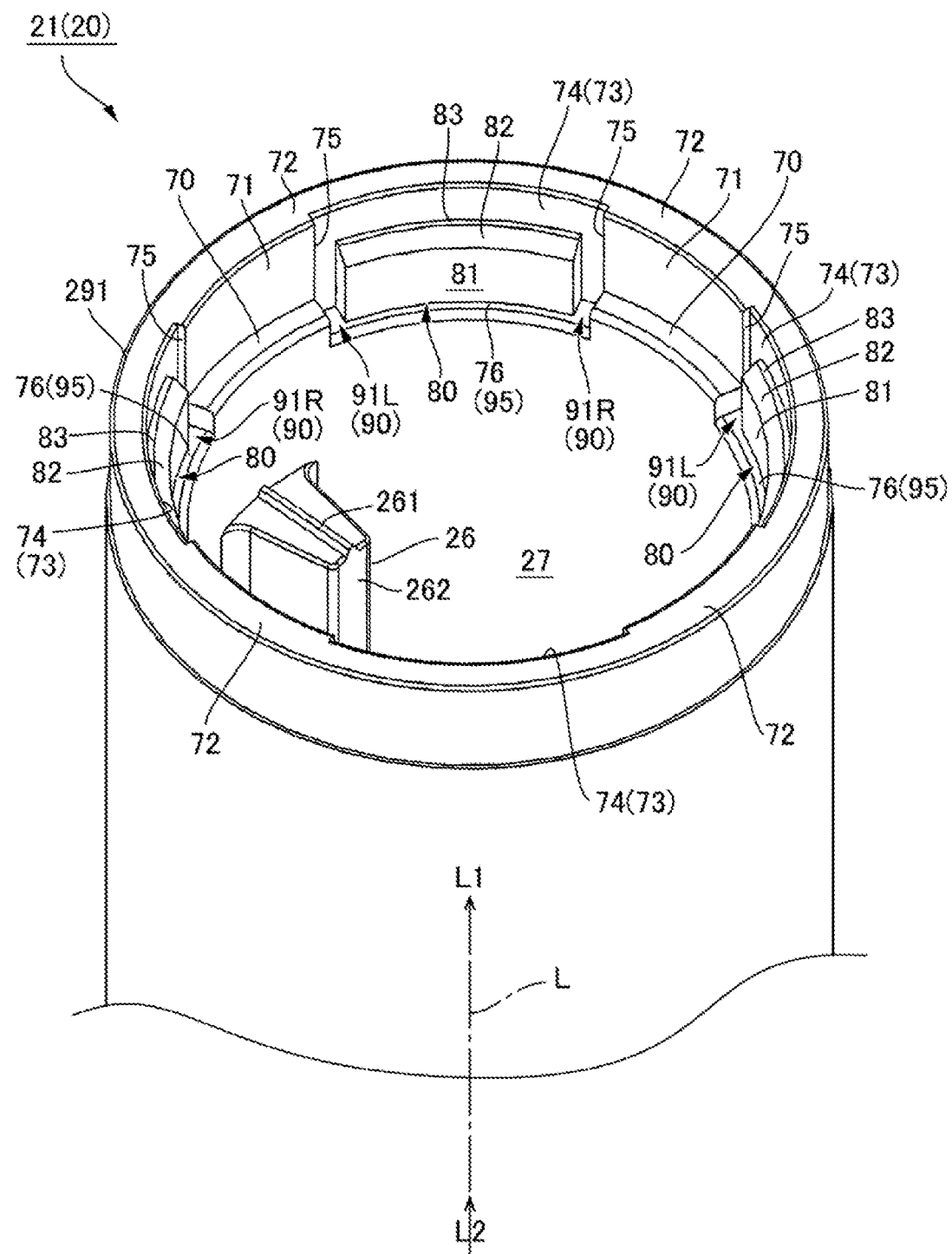
FIG. 7 is a perspective view showing an opening part of a case which is viewed from one side in an axial direction.

FIG. 6 is a front view showing the opening part 29 of the case 20 which is viewed from one side "L1" in the axial line "L" direction. FIG. 7 is a perspective view showing the opening part 29 of the case 20 which is viewed from one side "L1" in the axial line "L" direction. As shown in FIGS. 6 and 7, an end face on one side "L1" of the partitioning protruded part 26 is formed with a rib 261 extended in the radial direction. The rib 261 is connected with the cylindrical-shaped inner peripheral face 27 of the body part 21 and is extended in a straight line shape from the cylindrical-shaped inner peripheral face 27 to an inner peripheral side end face 262 of the partitioning protruded part 26. The rib 261 is crushed to a state corresponding to a gap space between the end face on one side "L1" of the partitioning protruded part 26 and the first flange part 421 of the turning shaft 40 when the fluid damper device 10 is structured. Therefore, it is structured that the fluid 12 does not pass through between the end face on one side "L1" of the partitioning protruded part 26 and the first flange part 421 of the turning shaft 40.

(Fixing Structure of Cover)

As shown in FIGS. 3 and 4, the cover 60 is a circular ring shape as a whole and is formed with a circular through hole 61 at its center for passing the second shaft part 44 of the rotor 30. The cover 60 is provided with a flange-shaped large diameter part 62 formed at an end part on one side "L1" in the axial line "L" direction and a small diameter part 63 protruded to the other side "L2" from a center of the large diameter part 62. An outer diameter of the small diameter part 63 is substantially constant and a tip end of the small diameter part 63 is formed with a ring-shaped end face 631 which faces the other side "L2" in the axial line "L" direction. The large diameter part 62 faces in the axial line "L" direction to an opening end face 291 provided at an end part on one side "L1" in the axial line "L" direction of the case 20, and the large diameter part 62 covers the opening end face 291 from one side "L1" in the axial line "L" direction.

As shown in FIG. 4, in the case 20, an end part on one side "L1" in the axial line "L" direction of the body part 21 is formed with a thin wall part 28. The inner peripheral face of the body part 21 is provided with the cylindrical-shaped inner peripheral face 27 which is formed with the partitioning protruded parts 26, and the thin wall part 28 is formed on one side "L1" in the axial line "L" direction of the cylindrical-shaped inner peripheral face 27. An abutting part 70 facing one side "L1" in the axial line "L" direction is formed between the cylindrical-shaped inner peripheral face 27 and the thin wall part 28, and the inner peripheral face of the thin wall part 28 is connected with the cylindrical-shaped inner peripheral face 27 through the abutting part 70. The cover 60 is positioned in the axial line "L" direction by abutting the ring-shaped end face 631 of the small diameter part 63 with the abutting part 70. Further, the small diameter part 63 of the cover 60 is, as described below, welded to the thin wall part 28 at a position different from the abutting part 70 in the circumferential direction.

As shown in FIGS. 6 and 7, the abutting part 70 is formed in parts in the circumferential direction on the inner peripheral face of the thin wall part 28. In this embodiment, the abutting part 70 is formed at four positions at equal angular intervals. The abutting part 70 is extended in a circular arc shape over a predetermined angular range in the circumferential direction. An inner circumferential edge of the abutting part 70 is chamfered in an "R"-shape and is connected with the cylindrical-shaped inner peripheral face 27. Further, an outer circumferential edge of the abutting part 70 is connected with the circular arc-shaped inner peripheral face 71 which is stood up to one side "L1" in the axial line "L" direction. The circular arc-shaped inner peripheral face 71 is an inner peripheral face of the thin wall part 28 and is a face in a circular arc shape with the center axial line (axial line "L") of the case 20 as a center. The cover 60 is positioned in a direction perpendicular to the axial line "L" by abutting the outer peripheral face of the small diameter part 63 with the circular arc-shaped inner peripheral face 71 in the radial direction. The circular arc-shaped inner peripheral face 71 is connected with the opening end face 291 which is the end face on one side "L1" in the axial line "L" direction of the case 20. A portion of the opening end face 291 which is connected with the circular arc-shaped inner peripheral face 71 is formed to be a wide width part 72 whose width in the radial direction is wider than other portions. The entire opening end face 291 including the wide width part 72 of the case 20 is covered by the large diameter part 62 of the cover 60 from one side "L1" in the axial line "L" direction. In this embodiment, positioning in the axial line "L" direction between the cover 60 and the case 20 is performed at the position where the abutting part 70 and the small diameter part 63 are abutted with each other. Therefore, the opening end face 291 of the case 20 and the large diameter part 62 are not abutted with each other in the axial line "L" direction and face each other with a space therebetween.

The abutting parts 70 are disposed at an angular interval of 90° with the axial line "L" which is the center of the cylindrical-shaped inner peripheral face 27 as a reference. Further, the abutting part 70 is formed at a position corresponding to the partitioning protruded part 26 in the circumferential direction. As shown in FIG. 6, in the four abutting parts 70, the centers in the circumferential direction of the two abutting parts 70 separated from each other by 180 degrees are coincided with the centers in the circumferential direction of the partitioning protruded parts 26. A rib 261 is formed at a center in the circumferential direction of the partitioning protruded part 26. Therefore, the centers in the circumferential direction of the two abutting parts 70 are coincided with the angular positions of the ribs 261. When the abutting part 70 is provided at the angular position of the rib 261, positioning in the axial line "L" direction of the cover 60 is performed at the angular position of the rib 261. In other words, positional accuracy in the axial line "L" direction of the cover 60 is enhanced by the angular positions of the ribs 261. As a result, sealing accuracy of the damper chamber 11 is enhanced.

As shown in FIGS. 6 and 7, the inner peripheral face of the thin wall part 28 is formed with a recessed part 73 which is formed by recessing a region between the abutting parts 70 adjacent to each other in the circumferential direction to an outer side in the radial direction and to the other side "L2" in the axial line "L" direction. In this embodiment, the recessed parts 73 are formed at four positions at equal angular intervals on the inner peripheral face of the thin wall part 28. The inner peripheral face of the recessed part 73 is provided with a circular arc-shaped inner peripheral face 74 which faces an inner side in the radial direction, a pair of side end faces 75 which are stood up to the inner side in the radial direction from both sides in the circumferential direction of the circular arc-shaped inner peripheral face 74, and a circular arc-shaped step face 76 which is connected with the circular arc-shaped inner peripheral face 74 and end edges on the other side "L2" in the axial line "L" direction of the side end faces 75. The recessed part 73 is recessed to a position on the other side "L2" in the axial line "L" direction with respect to the abutting part 70. Therefore, the circular arc-shaped step face 76 is located on the other side "L2" in the axial line "L" direction with respect to the abutting part 70. The circular arc-shaped step face 76 is a flat face which faces one side "L1" in the axial line "L" direction and is located on the other side "L2" in the axial line "L" direction with respect to the abutting part 70.

Each of the four recessed parts 73 is formed with a welding protruded part 80. In other words, the thin wall part 28 is formed with the welding protruded part 80 at four positions at equal angular intervals, and the welding protruded part 80 is formed at a position different from the abutting part 70 in the circumferential direction. The welding protruded part 80 is provided with a portion which is abutted with and welded to the small diameter part 63 and a portion which is not welded to the small diameter part 63 when the small diameter part 63 of the cover 60 is to be inserted into the thin wall part 28 and ultrasonically welded. In other words, the entire welding protruded part 80 does not become a welding portion to the small diameter part 63 but a part of the welding protruded part 80 becomes a welding portion to the small diameter part 63. The welding protruded part 80 is protruded to an inner side in the radial direction from the circular arc-shaped inner peripheral face 74 and is formed in a shape which is stood up to one side "L1" in the axial line "L" direction from the circular arc-shaped step face 76 of the recessed part 73. The welding protruded part 80 is extended in the axial line "L" direction by a predetermined height, and one end in the axial line "L" direction of the welding protruded part 80, the abutting part 70 and the other end in the axial line "L" direction of the welding protruded part 80 are arranged in the axial line "L" direction in this order. In other words, the welding protruded part 80 is formed in a range including the position in the axial line "L" direction of the abutting part 70. The inner peripheral face of the welding protruded part 80 is a circular arc-shaped inner peripheral face 81 with the axial line "L" as a center, and the face is located on an inner side in the radial direction with respect to the circular arc-shaped inner peripheral face 74 of the abutting part 70. A portion on an inner side in the radial direction of the welding protruded part 80 is a portion which is melted and softened to be integrated with the small diameter part 63 (portion of welding margin) when the small diameter part 63 of the cover 60 is fixed by ultrasonic welding.

Figure 8:
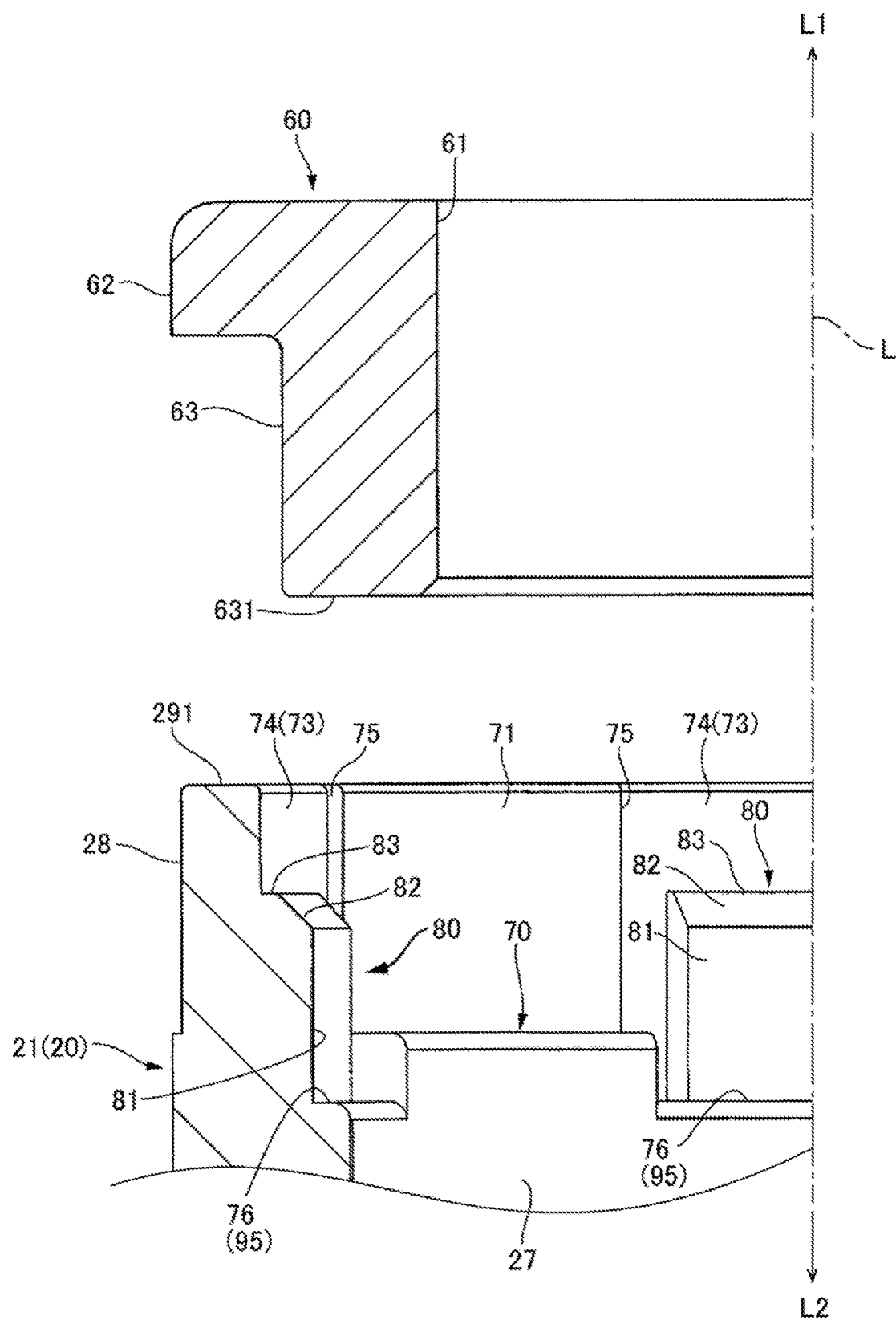
FIG. 8 is a partial sectional view showing a state that a case and a cover are separated from each other.
Figure 9:
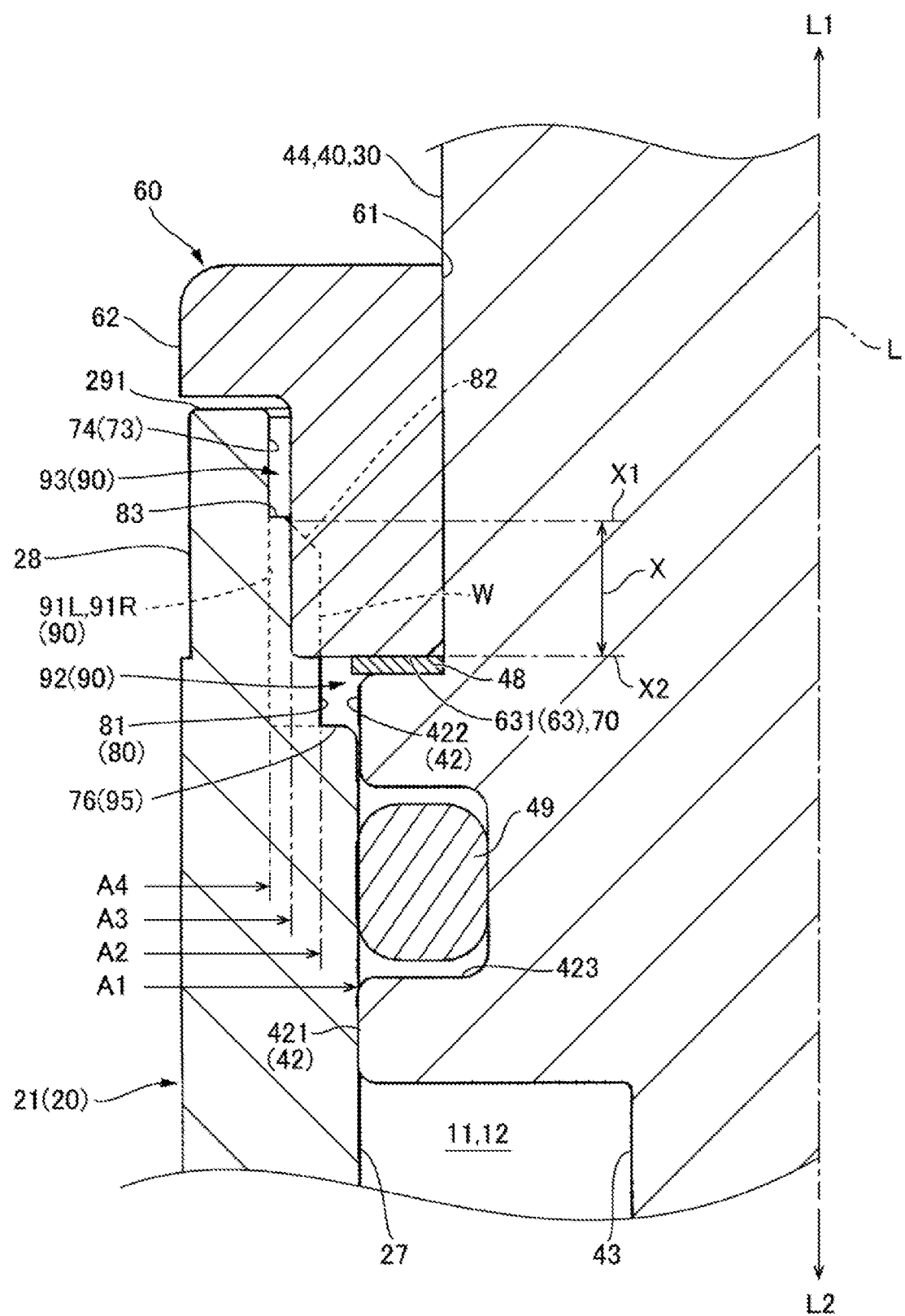
FIG. 9 is a partial sectional view showing a welding portion of a fluid damper device.

FIG. 8 is a partial sectional view showing a state that the case 20 and the cover 60 are separated from each other. Further, FIG. 9 is a partial sectional view showing a welding portion of the fluid damper device 10. In FIG. 9, a portion of a welding margin of the welding protruded part 80 is indicated by the reference sign "W". In this embodiment, a tip end of the small diameter part 63 of the cover 60 is inserted into the inner peripheral side of the thin wall part 28 and the welding protruded part 80 and the small diameter part 63 are abutted with each other. After that, an ultrasonic welding horn not shown is abutted at an angular position corresponding to the welding protruded part 80 from an outer side of the case 20 and the cover 60 to apply ultrasonic vibration and an abutting portion of the welding protruded part 80 with the small diameter part 63 is melted and softened. In this state, when the cover 60 is pushed to the case 20 side to push the small diameter part 63 to the other side "L2" in the axial line "L" direction, the cover 60 can be pushed to a position where the ring-shaped end face 631 of the small diameter part 63 is abutted with the abutting part 70. As a result, the cover 60 is positioned in the axial line "L" direction. Further, when the cover 60 is positioned in the axial line "L" direction by the abutting part 70, the second flange part 422 of the turning shaft 40 is positioned in the axial line "L" direction by an inner peripheral portion of the ring-shaped end face 631 of the small diameter part 63 through the washer 48. In other words, a pushing-in amount of the cover 60 to the case 20 is regulated by the abutting part 70. Further, a height in the axial line "L" direction of the damper chamber 11 is regulated by the abutting part 70.

As shown in FIG. 9, the small diameter part 63 of the cover 60 and the welding protruded part 80 are welded in a predetermined range in the axial line "L" direction. Hereinafter, a welding range in the axial line "L" direction is shown by the reference sign "X". Further, an end part on one side "L1" in the axial line "L" direction of the welding range "X" is referred to as one side end part "X1", and an end part on the other side "L2" in the axial line "L" direction of the welding range "X" is referred to as the other side end part "X2". As shown in FIG. 9, the other side end part "X2" in the welding range "X" is the same height as the ring-shaped end face 631 of the small diameter part 63 and is the same height as the abutting part 70. The welding protruded part 80 is extended to the other side "L2" in the axial line "L" direction with respect to the other side end part "X2" of the welding range "X". In other words, the welding protruded part 80 is formed in a range including a position of the other side end part "X2" of the welding range "X" in the axial line "L" direction.

Further, the welding protruded part 80 is extended to one side "L1" in the axial line "L" direction with respect to the one side end part "X1" of the welding range "X". An end part on one side in the axial line "L" direction of the welding protruded part 80 is formed with a tapered face 82 connected with the circular arc-shaped inner peripheral face 81 and a circular arc-shaped end face 83 which is enlarged from the tapered face 82 to an outer side in the radial direction. The tapered face 82 is inclined in a direction toward an outer side in the radial direction as going to one side "L1" in the axial line "L" direction. As shown in FIG. 9, the one side end part "X1" of the welding range "X" is a halfway position in the axial line "L" direction of the tapered face 82. The circular arc-shaped end face 83 is a flat face which faces one side "L1" in the axial line "L" direction and is provided at a position lowered by one stage to the other side "L2" in the axial line "L" direction with respect to the opening end face 291 of the case 20. The circular arc-shaped end face 83 is connected to a halfway position in the axial line "L" direction of the circular arc-shaped inner peripheral face 74 of the recessed part 73. In other words, a step part is formed by the circular arc-shaped end face 83 and the circular arc-shaped inner peripheral face 74 at an end part on one side "L1" in the axial line "L" direction of the welding protruded part 80.

(Flow-Out Prevention Part and Flow-Out Restriction Part)

The case 20 in this embodiment is provided with a flow-out prevention part 90 for holding molten resin (molten material) which is melted and softened by ultrasonic vibration at a position adjacent to the welding protruded part 80. In a case that the molten resin (molten material) is projected, the flow-out prevention part 90 functions as a welding burr reservoir accommodating the molten resin (molten material). The flow-out prevention part 90 holds the molten resin (molten material) and, alternatively, the flow-out prevention part 90 may be left as a space where the molten resin (molten material) is not protruded. Further, the case 20 is provided with a flow-out restriction part 95 structured to restrict the molten resin from flowing to a side of an O-ring 49 which seals the damper chamber 11 on the other side "L2" in the axial line "L" direction of the flow-out prevention part 90. Specifically, the circular arc-shaped step face 76 of the recessed part 73 where the welding protruded part 80 is formed functions as the flow-out restriction part 95. The circular arc-shaped step face 76 (flow-out restriction part 95) is provided between the welding protruded part 80 and the O-ring 49 and thus the molten resin (molten material) projected from the welding protruded part 80 is restricted from reaching to the O-ring 49. In this embodiment, an "R"-shaped chamfer part is provided at an inner circumferential edge of the circular arc-shaped step face 76, and the chamfer part is included in the flow-out restriction part 95.

In this embodiment, first flow-out prevention parts 91L and 91R are provided at positions adjacent to the welding protruded part 80 in the circumferential direction as the flow-out prevention part 90. As shown in FIG. 7, the first flow-out prevention parts 91L and 91R are groove-shaped gap spaces provided on both sides in the circumferential direction of the welding protruded part 80. The first flow-out prevention parts 91L and 91R are provided between the welding protruded part 80 and the side end faces 75 of the recessed part 73. The first flow-out prevention parts 91L and 91R are continuously provided in the axial line "L" direction in a range from the opening end face 291 provided at the end part on one side "L1" in the axial line "L" direction of the case 20 to the circular arc-shaped step face 76 of the recessed part 73.

Further, as shown in FIG. 9, as other flow-out prevention parts 90, a second flow-out prevention part 92 provided on an inner side in the radial direction of a portion on the other side "L2" in the axial line "L" direction of the welding protruded part 80 and a third flow-out prevention part 93 provided on one side "L1" in the axial line "L" direction of the welding protruded part 80 are formed. The circular arc-shaped inner peripheral face 81 of the welding protruded part 80 is provided at a position retreated to an outer side in the radial direction with respect to the cylindrical-shaped inner peripheral face 27 of the case 20. Therefore, the second flow-out prevention part 92 which is a gap space in the radial direction is formed between the circular arc-shaped inner peripheral face 81 and the flange part 42 of the turning shaft 40 on an inner side in the radial direction of the welding protruded part 80 and on the other side "L2" in the axial line "L" direction with respect to the welding range "X".

Both ends in the circumferential direction of the second flow-out prevention part 92 are connected with the first flow-out prevention parts 91L and 91R described above, and the circular arc-shaped step face 76 (flow-out restriction part 95) is provided on the other side "L2" in the axial line "L" direction of the first flow-out prevention parts 91L and 91R and the second flow-out prevention part 92. In a case that molten resin (molten material) which is melted and softened when ultrasonic welding is performed is projected to both sides in the circumferential direction of the welding protruded part 80, the molten resin is held by the first flow-out prevention parts 91L and 91R. Similarly, in a case that molten resin (molten material) which is melted and softened when ultrasonic welding is performed is projected to an inner side in the radial direction of the welding protruded part 80 on the other side "L2" in the axial line "L" direction of the small diameter part 63 of the cover 60, the molten resin is held by the second flow-out prevention part 92. The molten resin (molten material) held by the first flow-out prevention parts 91L and 91R and the second flow-out prevention part 92 are held by the circular arc-shaped step face 76 (flow-out restriction part 95) provided on the other side in the axial line "L" direction of the first flow-out prevention parts 91L and 91R and the second flow-out prevention part 92 so as not to project to a position of the O-ring 49. Therefore, there is less possibility that the O-ring 49 is deformed by the molten resin (molten material).

The third flow-out prevention part 93 is a gap space in the radial direction which is provided between the outer peripheral face of the small diameter part 63 of the cover 60 and the circular arc-shaped inner peripheral face 74 of the recessed part 73 of the case 20 on an upper side of the circular arc-shaped end face 83 provided on one side "L1" in the axial line "L" direction of the welding protruded part 80. In a case that molten resin (molten material) which is melted and softened when ultrasonic welding is performed is projected to one side in the axial line "L" direction of the welding protruded part 80, the molten resin is held by the third flow-out prevention part 93. As described above, a step part is provided between the opening end face 291 of the case 20 and the welding protruded part 80, and the third flow-out prevention part 93 is secured. Therefore, the molten resin (molten material) is prevented from projecting to the outside from a gap space between the opening end face 291 of the case 20 and the large diameter part 62 of the cover 60, and a welding burr can be avoided being formed by projecting the molten resin (molten material) to the outside of the case 20 and the cover 60.

The opening end face 291 of the case 20 is covered by the large diameter part 62 of the cover 60 from one side "L1" in the axial line "L" direction. Further, the third flow-out prevention part 93 provided on an inner peripheral side of the opening end face 291 and the first flow-out prevention parts 91L and 91R provided on both sides in the circumferential direction are also covered by the large diameter part 62 of the cover 60 from one side "L1" in the axial line "L" direction. In other words, the large diameter part 62 functions as a blind plate which covers the first flow-out prevention parts 91L and 91R and the third flow-out prevention part 93. Further, as described above, the large diameter part 62 of the cover 60 is not abutted with the opening end face 291 of the case 20, and a gap space to which a small amount of the molten resin is capable of projecting is formed between the opening end face 291 of the case 20 and the large diameter part 62 of the cover 60.

In this embodiment, in FIG. 9, when a radial position of a sealing position by the O-ring 49 (in other words, a position where the O-ring 49 is abutted with the cylindrical-shaped inner peripheral face 27 of the case 20) is indicated by the reference sign "A1", a radial position of the circular arc-shaped inner peripheral face 81 of the welding protruded part 80 is indicated by the reference sign "A2", a radial position of the outer peripheral face of the small diameter part 63 is indicated by the reference sign "A3", and a radial position of the circular arc-shaped inner peripheral face 74 of the recessed part 73 is indicated by the reference sign "A4", the radial positions "A1", "A2", "A3" and "A4" are arranged in this order from the inner side in the radial direction to the outer side in the radial direction. The first flow-out prevention parts 91L and 91R are gap spaces extended in a range from the radial position "A1" to the radial position "A4" on the other side "L2" in the axial line "L" direction with respect to the other side end part "X2" of the welding range "X". However, on one side in the axial line "L" direction with respect to the other side end part "X2" of the welding range "X", the first flow-out prevention parts 91L and 91R are gap spaces extended in a range from the radial position "A3" to the radial position "A4". Further, the second flow-out prevention part 92 is a gap space in a range from the radial position "A1" to the radial position "A2", and the third flow-out prevention part 93 is a gap space in a range from the radial position "A3" to the radial position "A4". In this embodiment, the circular arc-shaped step face 76 which is a plane functioning as the flow-out restriction part 95 is formed in a range from the radial position "A1" to the radial position "A2" in an angular range where the second flow-out prevention part 92 is provided. Further, the circular arc-shaped step face 76 is formed in a range from the radial position "A1" to the radial position "A4" in an angular range where the first flow-out prevention parts 91L and 91R are provided.

(Principal Effects in this Embodiment)

As described above, in the fluid damper device 10 in this embodiment, the welding protruded part 80 which is welded to the cover 60 is formed in a part in the circumferential direction of the inner peripheral face of the case 20. Further, on the other side "L2" in the axial line "L" direction with respect to the welding range "X" where the welding protruded part 80 and the cover are welded to each other, the second flow-out prevention part 92 is provided on the other side "L2" in the axial line "L" direction with respect to the welding range "X" and on an inner side in the radial direction with respect to the circular arc-shaped inner peripheral face 81 of the welding protruded part 80 as the flow-out prevention part 90 for appropriately handling the molten resin which is projected from the welding portion. The second flow-out prevention part 92 is a gap space in the radial direction between the circular arc-shaped inner peripheral face 81 of the welding protruded part 80 and the outer peripheral face of the small diameter part 63 of the cover 60. The molten resin (welding material) which is projected from the welding portion can be appropriately handled by the gap space. For example, the molten resin can be held so as not to project to a side of the damper chamber 11.

In this embodiment, the first flow-out prevention parts 91L and 91R are formed as the flow-out prevention part 90 at positions adjacent to the welding protruded part 80 in the circumferential direction. The first flow-out prevention parts 91L and 91R are gap spaces formed between the inner peripheral face of the case 20 and the outer peripheral face of the small diameter part 63 of the cover 60 on both sides in the circumferential direction of the welding protruded part 80. Further, the third flow-out prevention part 93 is provided as the flow-out prevention part 90 on one side "L1" in the axial line "L" direction with respect to the welding range "X". The third flow-out prevention part 93 is a gap space in the radial direction between the inner peripheral face of the case 20 (circular arc-shaped inner peripheral face 74) and the outer peripheral face of the small diameter part 63 of the cover 60. The first flow-out prevention parts 91L and 91R are, similarly to the second flow-out prevention part 92, capable of holding the molten resin so as not to project to a side of the damper chamber 11. Further, the third flow-out prevention part 93 is capable of holding the molten resin so as not to project to the outside from a gap space between the opening part 29 of the case 20 and the large diameter part 62 of the cover 60. Therefore, there is less possibility that the molten resin is projected to the outside of the case 20 and the cover 60 to form a welding burr and thus, process for removing a welding burr may not be required.

In this embodiment, the second flow-out prevention part 92 and the third flow-out prevention part 93 are connected with the first flow-out prevention parts 91L and 91R and they structure a continuous flow-out prevention part 90 as a whole. However, it may be structured that the first flow-out prevention parts 91L and 91R, the second flow-out prevention part 92 and the third flow-out prevention part 93 are not connected with each other. Further, an embodiment that a part or the whole of the first flow-out prevention parts 91L and 91R and the third flow-out prevention part 93 are not provided may be adopted.

The cover 60 in this embodiment is provided with the small diameter part 63 inserted into the end part (thin wall part 28) of the case 20 and the large diameter part 62 having a larger diameter than the small diameter part 63, and the small diameter part 63 is inserted into the case 20 and is positioned in a direction perpendicular to the axial line "L" direction by the circular arc-shaped inner peripheral face 71 formed at a position different from the welding protruded part 80 in the circumferential direction. Therefore, the cover 60 and the case 20 can be coaxially positioned at the position different from the welding portion in the circumferential direction. Further, the large diameter part 62 covers the opening end face 291 of the case 20 and the first flow-out prevention parts 91L and 91R and the third flow-out prevention part 93 formed on its inner peripheral side from the one side in the axial line "L" direction. Therefore, the molten resin projected to the first flow-out prevention parts 91L and 91R and the third flow-out prevention part 93 is not directly observed from the outside and thus the appearance is satisfactory. Further, even if molten resin is projected by a very small amount from the first flow-out prevention parts 91L and 91R and the third flow-out prevention part 93 to form a welding burr, the welding burr is covered by the large diameter part 62 and is not directly observed and thus a process for removing the welding burr is not required. In addition, the large diameter part 62 is not abutted with the opening end face 291 and thus there is less possibility that the cover 60 is pushed up by projected molten resin. Therefore, there is less possibility that positional accuracy in the axial line "L" direction of the cover 60 is deteriorated.

In this embodiment, the circular arc-shaped end face 83 which is an end face on one side "L1" in the axial line "L" direction of the welding protruded part 80 is provided at a position recessed to the other side "L2" in the axial line "L" direction with respect to the opening end face 291 which is an end face on one side "L1" in the axial line "L" direction of the case 20. Further, a step part is formed by the circular arc-shaped end face 83 and the circular arc-shaped inner peripheral face 74 of the case 20 on one side "L1" in the axial line "L" direction of the welding protruded part 80. Therefore, a space for forming the third flow-out prevention part 93 is easily secured on one side "L1" in the axial line "L" direction of the welding protruded part 80. Further, the welding protruded part 80 is provided with the tapered face 82 which is connected with an inner circumferential edge of the step part (inner circumferential edge of the circular arc-shaped end face 83), and the tapered face 82 is inclined in a direction enlarged to an outer side in the radial direction as going to one side "L1" in the axial line "L" direction. When the tapered face 82 is provided, the case 20 and the cover 60 are coaxially positioned easily. Further, an outer circumferential edge of the tip end face (ring-shaped end face 631) of the small diameter part 63 can be abutted with the tapered face 82 of the welding protruded part 80 in the axial line "L" direction and thus the welding protruded part 80 and the small diameter part 63 can be contacted with each other not by a face but by a line. Therefore, when ultrasonic welding is to be performed, a satisfactory contact state can be attained.

In this embodiment, the flow-out restriction part 95 is provided on the other side "L2" in the axial line "L" direction of the flow-out prevention part 90. For example, the circular arc-shaped step face 76 which functions as the flow-out restriction part 95 is provided on the other side "L2" in the axial line "L" direction of the first flow-out prevention parts 91L and 91R and the second flow-out prevention part 92. The flow-out restriction part 95 is provided with a plane (circular arc-shaped step face 76) perpendicular to the axial line "L" direction and is provided on one side "L1" in the axial line "L" direction with respect to the O-ring 49. In this embodiment, in the flow-out restriction part 95, a range in the radial direction where the circular arc-shaped step face 76 which is a plane intersecting the axial line "L" direction is provided is a range from the inner peripheral face (radial position "A2") of the welding protruded part 80 to the sealing position (radial position "A1") where the O-ring 49 is abutted with the inner peripheral face of the case 20 in the angular range where the second flow-out prevention part 92 is provided. Further, the inner circumferential edge of the flow-out restriction part 95 is connected with the cylindrical-shaped inner peripheral face 27 (in other words, the inner peripheral face of the damper chamber), and the inner peripheral edge of the flow-out restriction part 95 has the same diameter as the face (cylindrical-shaped inner peripheral face 27) with which the O-ring 49 is abutted. When the flow-out restriction part 95 is provided in the above-mentioned range, there is less possibility that molten resin is projected to a side of the O-ring 49 from a gap space in the radial direction. Further, the flow-out restriction part 95 is provided in an angular range corresponding to the welding portion and, in this embodiment, is provided over the entire range where the welding protruded part 80 is provided and an angular range including the first flow-out prevention parts 91L and 91R on its both sides in the circumferential direction. Therefore, there is less possibility that molten resin is projected to a side of the O-ring 49 from a gap space in the circumferential direction.

In this embodiment, the flow-out restriction part 95 includes the circular arc-shaped step face 76 and the "R"-shaped chamfer part formed at the inner peripheral edge of the circular arc-shaped step face 76. However, the flow-out restriction part 95 may be provided with no chamfer face and the entire flow-out restriction part 95 is formed in a plane perpendicular to the axial line "L". Further, the flow-out restriction part 95 in this embodiment is provided over the entire angular range where the welding protruded part 80 is provided. However, the flow-out restriction part 95 may be provided only in a part of an angular range corresponding to the welding portion.

In this embodiment, the welding protruded part 80 is formed in a shape provided with the circular arc-shaped inner peripheral face 81 with the axial line "L" which is a turning center of the rotor 30 as a center. Therefore, the small diameter part 63 of the cover 60 and the welding protruded part 80 can be uniformly contacted with each other in the circumferential direction and uniformly welded in the circumferential direction.

In this embodiment, the inner peripheral face of the case 20 is formed with the abutting part 70 which is abutted in the axial line "L" direction with the small diameter part 63 of the cover 60 fixed to the opening part 29 of the case 20 in a part in the circumferential direction. Further, the abutting part 70 is formed at a position different from the welding protruded part 80 in the circumferential direction, and one end in the axial line "L" direction of the welding protruded part 80, the abutting part 70 and the other end in the axial line "L" direction of the welding protruded part 80 are arranged in this order in the axial line "L" direction. In other words, the welding protruded part 80 is formed in a range including the position in the axial line "L" direction of the abutting part 70. Therefore, the tip end face of the small diameter part 63 is abutted with the welding protruded part 80 and melted and, the small diameter part 63 is pushed down until abutted with the abutting part 70, thus the cover 60 can be positioned in the axial line "L" direction. As a result, a height of the other side end part "X2" in the axial line "L" direction of the welding range "X" and a height in the axial line "L" direction of the abutting part 70 become the same as each other and thus, the second flow-out prevention part 92 can be formed on the other side "L2" in the axial line "L" direction with respect to the abutting part 70.

Further, when the welding protruded part 80 and the abutting part 70 are formed at positions different from each other in the circumferential direction, there is less possibility that the abutting part 70 is deformed at the time of welding. Therefore, the cover 60 can be positioned in the axial line "L" direction with respect to the case 20 with a high degree of accuracy. Further, when the welding protruded part 80 is formed in a range extended across the height of the abutting part 70, in comparison with a case that the welding protruded part 80 and the abutting part 70 are provided so as to shift from each other in the axial line "L" direction, the size in the axial line "L" direction of the fluid damper device 10 can be reduced.

In this embodiment, the inner peripheral face of the case 20 is formed with the partitioning protruded part 26 which partitions the damper chamber 11 in the circumferential direction, and the abutting part 70 is formed at a position corresponding to the partitioning protruded part 26 in the circumferential direction. Therefore, positioning in the axial line "L" direction of the cover 60 can be performed at the position of the partitioning protruded part 26 with a high degree of accuracy. Especially, in this embodiment, the abutting part 70 is formed in a range including the angular position of the rib 261 formed on the end face on one side in the axial line "L" direction of the partitioning protruded part 26, and the rib 261 is formed at a center in the circumferential direction of the abutting part 70. Therefore, positioning in the axial line "L" direction of the cover 60 can be performed at the position of the rib 261 for enhancing sealing accuracy of the damper chamber 11 with a high degree of accuracy. Therefore, the sealing accuracy of the damper chamber 11 can be enhanced.

In this embodiment, the abutting part 70 is formed at four positions at equal angular intervals with the axial line "L" which is the center in the diameter direction of the case 20 as a reference, and two of the four abutting parts 70 disposed oppositely to each other in the diameter direction are formed in a range including the angular position of the rib 261 of the partitioning protruded part 26. In other words, the abutting parts 70 are equally formed in the circumferential direction and thus positioning in the axial line "L" direction of the cover 60 can be performed with a high degree of accuracy and an inclination of the cover 60 can be restrained. Further, the case 20 and the cover 60 can be welded each other at the positions where the abutting parts 70 are not provided and thus welding parts can be provided in the circumferential direction equally. Therefore, the welding parts can be provided in the circumferential direction in a well-balanced manner.

Further, each of the abutting part 70 and the welding protruded part 80 may be provided at three positions or two positions instead of four positions. Alternatively, each of the abutting part 70 and the welding protruded part 80 may be provided at five positions or more. In each of the cases, it is desirable to provide them at equal angle intervals, but may be provided in an arrangement other than equal angular intervals. For example, when they are respectively provided at two positions, they may be provided on an opposite side to each other with a center in the radial direction of the case 20 as a reference. Alternatively, they may be shifted by a predetermined angle from two positions on a straight line (in other words, two positions separated by 180°) extending in a diameter direction of the case. Further, in a case of providing three positions, two positions of the three positions and remaining one position may be oppositely arranged with a center in the radial direction of the case 20 as a reference. For example, the abutting part 70 may be arranged at three positions which are apexes of an isosceles triangle. In addition, in a case of providing four positions, totaled four positions may be provided, i.e., in a first straight line and a second line which are extended in a diameter direction of the case 20 and are intersected each other, two positions on an opposite side to each other on the first straight line with a center in the diameter direction of the case 20 as a reference, and two positions on an opposite side to each other on the second straight line with the center in the diameter direction of the case 20 as a reference. In this case, it is desirable that the two positions on the first straight line are overlapped with the ribs 261.

In this embodiment, the inner peripheral face (circular arc-shaped inner peripheral face 81) of the welding protruded part 80 is a face without unevenness in the radial direction. However, when the welding protruded part 80 is formed in a shape which is recessed to an outer side in the radial direction on the other side "L2" in the axial line "L" direction with respect to the abutting part 70, a width in the radial direction of the second flow-out prevention part 92 is increased.

Further, in this embodiment, the flow-out prevention part 90 is provided at three positions, i.e., the first flow-out prevention parts 91L and 91R, the second flow-out prevention part 92, and the third flow-out prevention part 93. In this case, it is desirable that a total of the capacities at the three positions is set to be larger than a volume of the welding margin "W". According to this structure, all the molten resin can be held by the flow-out prevention part 90. Therefore, there is less possibility that molten resin is projected to a position contacting with the O-ring 49, and there is less possibility that molten resin is projected to the outside of the case 20 and the cover 60.

The invention claimed is:
1. A fluid damper device comprising:
   a case in a bottomed tube shape which is opened to one side in an axial direction;
   a rotor comprising a turning shaft and a valve body which are inserted into a damper chamber formed in the case;
   a fluid which is filled in the damper chamber;
   a cover which comprises a through hole through which the rotor is penetrated, the cover being fixed to an opening part of the case; and a sealing member which seals a gap space between an outer peripheral face of the rotor and an inner peripheral face of the case;

wherein an inner peripheral face of the case is formed with a welding protruded part welded to the cover in a part in a circumferential direction;

wherein the welding protruded part and the cover are welded to each other in a predetermined range in the axial direction; and wherein a flow-out prevention part is provided on an inner side in a radial direction of the welding protruded part on an other side in the axial direction with respect to the predetermined range.

2. The fluid damper device according to claim 1, wherein a flow-out restriction part is provided on the other side in the axial direction of the flow-out prevention part.

3. The fluid damper device according to claim 2, wherein the flow-out restriction part comprises a flat face intersecting the axial direction.

4. The fluid damper device according to claim 3, wherein a range in the radial direction where the flat face is provided is within a range from an inner peripheral face of the welding protruded part to a sealing position where the sealing member is abutted with the inner peripheral face of the case.

5. The fluid damper device according to claim 2, wherein the flow-out restriction part is provided in an angular range corresponding to the welding protruded part.

6. The fluid damper device according to claim 2, wherein the flow-out restriction part is provided on the one side in the axial direction with respect to the sealing member.

7. The fluid damper device according to claim 2, wherein an inner peripheral edge of the flow-out restriction part is formed in a circular arc shape having a same diameter as a diameter of an inner peripheral face of the damper chamber.

8. The fluid damper device according to claim 1, wherein an inner peripheral face of the welding protruded part is formed in a circular arc shape with a turning center of the rotor as a center.

9. The fluid damper device according to claim 1, wherein the welding protruded part comprises a tapered face inclined in a direction enlarging to an outer side in the radial direction as going to the one side in the axial direction.

10. The fluid damper device according to claim 1, wherein the flow-out prevention part is provided at a position adjacent to the welding protruded part in a circumferential direction on the other side in the axial direction with respect to the predetermined range.

11. The fluid damper device according to claim 1, wherein the flow-out prevention part is provided on the one side in the axial direction of the predetermined range.

12. The fluid damper device according to claim 11, wherein the cover comprises a small diameter part which is inserted into the case and is welded to the welding protruded part and a large diameter part having a larger diameter than a diameter of the small diameter part, and the flow-out prevention part is covered by the large diameter part from the one side in the axial direction.

13. The fluid damper device according to claim 12, wherein the case comprises a circular arc-shaped inner peripheral face with a turning center of the rotor as a center at a position different from the welding protruded part in the circumferential direction, and the small diameter part is positioned in a direction perpendicular to the axial direction by the circular arc-shaped inner peripheral face.

14. The fluid damper device according to claim 1, wherein an inner peripheral face of the case is formed with an abutting part which is abutted in the axial direction with the cover at a position different from the welding protruded part in the circumferential direction, and one end in the axial direction of the welding protruded part, the abutting part, and an other end in the axial direction of the welding protruded part are arranged in this order in the axial direction.

15. The fluid damper device according to claim 14, wherein an inner peripheral face of the case is formed with a partitioning protruded part which partitions the damper chamber in the circumferential direction, and the abutting part is formed at a position corresponding to the partitioning protruded part in the circumferential direction.

16. The fluid damper device according to claim 15, wherein an end face on the one side in the axial direction of the partitioning protruded part is formed with a rib extended in a radial direction, and the abutting part is formed in a range including an angular position of the rib.

17. The fluid damper device according to claim 16, wherein the abutting part is formed at four positions separated from each other in the circumferential direction, two of the four positions are located at two positions on a first straight line extended in a diameter direction of the case and arranged oppositely with a center in the diameter direction of the case as a reference, the two positions being overlapped with the ribs in the axial direction, and remaining two positions of the four positions are located at two positions on a second straight line extended in a diameter direction of the case and intersecting the first straight line and arranged oppositely with the center in the diameter direction of the case as the reference.

18. The fluid damper device according to claim 17, wherein the abutting part is formed at four positions at equal angular intervals with the center in the diameter direction of the case as the reference.

19. The fluid damper device according to claim 14, wherein the abutting part is formed at two positions oppositely with a center in the diameter direction of the case as a reference.

20. The fluid damper device according to claim 19, wherein the abutting part is formed at two positions on a straight line extended in a diameter direction of the case and on opposite sides to each other with the center in the diameter direction of the case as the reference.

21. The fluid damper device according to claim 14, wherein the abutting part is formed at three positions separated from each other in the circumferential direction, and two of the three positions are arranged on an opposite side to remaining one position of the three positions with a center in a radial direction of the case as a reference.

22. The fluid damper device according to claim 21, wherein the abutting part is formed at three positions at equal angular intervals with the center in the diameter direction of the case as the reference.

23. An apparatus with a damper comprising:
the fluid damper device defined in claim 1; wherein
an opening and closing member which is turnable with respect to an apparatus main body is attached to the turning shaft.

24. The apparatus with a damper according to claim 23, wherein the opening and closing member is a toilet seat of a Western-style toilet bowl.

* * * * *